United States Patent
Mitsumoto et al.

(10) Patent No.: US 9,499,201 B2
(45) Date of Patent: Nov. 22, 2016

(54) VEHICULAR TRAVEL CONTROL DEVICE

(71) Applicants: Hisanori Mitsumoto, Gotenba (JP);
Takahiro Kodaira, Machida (JP)

(72) Inventors: Hisanori Mitsumoto, Gotenba (JP);
Takahiro Kodaira, Machida (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/441,764

(22) PCT Filed: Nov. 8, 2012

(86) PCT No.: PCT/JP2012/078991
§ 371 (c)(1),
(2) Date: May 8, 2015

(87) PCT Pub. No.: WO2014/073075
PCT Pub. Date: May 15, 2014

(65) Prior Publication Data
US 2015/0291214 A1  Oct. 15, 2015

(51) Int. Cl.
B62D 15/02 (2006.01)
B62D 5/00 (2006.01)
B62D 5/04 (2006.01)
B62D 6/00 (2006.01)

(52) U.S. Cl.
CPC .......... B62D 15/025 (2013.01); B62D 5/008 (2013.01); B62D 5/0457 (2013.01); B62D 5/0481 (2013.01); B62D 6/002 (2013.01)

(58) Field of Classification Search
CPC .... B62D 6/002; B62D 5/008; B62D 5/0481; B62D 5/0457; B62D 15/025
USPC .............................. 701/41, 48; 180/400, 402
See application file for complete search history.

(56) References Cited

U.S. PATENT DOCUMENTS

2007/0235995 A1* 10/2007 Shiga .................... B60R 21/203
280/731

FOREIGN PATENT DOCUMENTS

| DE | 10 2006 023 562 A1 | 11/2007 |
|---|---|---|
| DE | 10 2006 041 236 A1 | 3/2008 |
| DE | 10 2007 002 266 A1 | 7/2008 |
| JP | 2004-99011 A | 4/2004 |
| JP | 2005-255098 A | 9/2005 |

(Continued)

OTHER PUBLICATIONS

Office Action issued Sep. 12, 2016 in German Patent Application No. 11 2012 007 112.3 (with English Translation).

*Primary Examiner* — Marthe Marc-Coleman
(74) *Attorney, Agent, or Firm* — Oblon, McClelland, Maier & Neustadt, L.L.P.

(57) ABSTRACT

A vehicular steering control device which comprises a rudder angle varying device which changes a relationship between an operational position of steering wheel operated for steering by a driver and a rudder angle of front wheels; and a rudder angle control device which performs an automatic steering control of the front wheels for a trajectory control of a vehicle by controlling the rudder angle varying device. The rudder angle control device performs a termination control which removes a deviation in the relationship between an operational position and a rudder angle of the front wheels, namely, an N deviation when the automatic steering control is terminated. A speed of removing the N deviation is lowered when a magnitude of a steering operation speed is small, compared to when a magnitude of a steering operation speed is large.

6 Claims, 8 Drawing Sheets

(56) References Cited

FOREIGN PATENT DOCUMENTS

| JP | 2006-96187 A | 4/2006 |
| JP | 2007-196808 A | 8/2007 |
| JP | 2010-149612 A | 7/2010 |
| JP | 2012-232676 A | 11/2012 |

* cited by examiner

VEHICULAR TRAVEL CONTROL DEVICE

The present invention relates to a vehicular travel control device, and more specifically, relates to a vehicular travel control device which controls travelling of a vehicle by performing an automatic steering control which controls rudder angle of steerable wheels.

BACKGROUND

Travel control devices for vehicles such as automobiles which have been known include travelling trajectory control devices which control a travelling trajectory so that a vehicle travels along a target trajectory, or lane keeping devices which prevent a vehicle from deviating from a travelling lane by deciding amount of lateral deviation from the travelling lane. In these travel control devices, an automatic steering control which automatically steers steerable wheels by a rudder angle varying device is performed, irrespective of whether or not steering operation is being performed by a driver.

The automatic steering of steerable wheels by a rudder angle varying device sometimes causes a situation so called N (neutral) deviation in which the relationship between a rotational position of a steering wheel and a rudder angle of steerable wheels is different from a proper relationship. Therefore, there have already been suggested various N deviation modifying controls for reducing N deviation at the time of terminating an automatic steering control in a travel control device which automatically steers steerable wheels.

For example, JP 2007-196808A describes an example of travel control device which is configured to take a predetermined time in performing an operation of moving a steering input device such as a steering wheel to a predetermined position, when a steering mode is transitioned from an automatic steering mode to a manual steering mode.

BRIEF SUMMARY

Problem to be Solved by Invention

In order to reduce N deviation, a rudder angle varying device must be controlled such that the relationship between a rotational position of a steering wheel and a rudder angle of steerable wheels becomes a proper relationship, that is, a relationship in which a neutral position of the steering wheel coincides with a rudder angle of 0 of steerable wheels. Accordingly, it is necessary to rotate a steering wheel so that a rotational position of the steering wheel coincides with a rudder angle of steerable wheels, or to steer steerable wheels so that a rudder angle of the steerable wheels coincides with a rotational position of the steering wheel.

Therefore, a steering wheel can rotate while there is no change in movement of a vehicle, or movement of a vehicle can change while a steering wheel is not rotated. As a result, it is inevitable that a person in the vehicle has an unusual feeling. This problem is more noticeable the larger an N deviation amount is, the higher a vehicle speed is, or the lower a speed of steering operation by a driver is.

In this connection, according to the travel control device described in the above laid-open document, although it is possible to alleviate an unusual feeling, the unusual feeling felt by a person in a vehicle cannot be effectively reduced. It has also been suggested performing the N deviation modifying control only in a situation where a steering wheel is rotated toward the neutral position. However, in that case, there will be problem that a steering transmission ratio would significantly vary depending on steering direction, causing another unusual feeling; and that the N deviation amount would not be reduced unless the steering wheel is rotated in the direction toward the neutral position.

The present invention was accomplished in view of the problem of the unusual feeling felt when the N deviation is reduced in a conventional travel control device which performs an automatic steering control. The main subject of the present invention is to effectively reduce the unusual feeling resulted by the reduction of N deviation, with ensuring the reduction of N deviation as efficient as possible, by focusing on the fact that the lower a steering operation speed by a driver is, the more noticeable the unusual feeling resulted by the reduction of N deviation is.

Means for Solving the Problem and Effects of the Invention

According to the present invention, the above mentioned main subject is accomplished by a vehicular steering control device which comprises: a rudder angle varying device which changes a relationship between an operational position of a steering input device operated for steering by a driver and a rudder angle of steering wheels; and a rudder angle control device which performs an automatic steering control which controls the rudder angle of the steering wheels by controlling the rudder angle varying device; and the rudder angle control device performs a termination control which makes the relationship revert to a standard relationship when the automatic steering control is terminated, wherein the rudder angle control device lowers a speed of making the relationship revert to the standard relationship when a magnitude of a steering operation speed is small, compared to when a magnitude of a steering operation speed is large.

According to the above structure, the speed of making the above described relationship revert to the standard relationship is made lower when the steering operation speed is low, compared to when a steering operation speed is high. Accordingly, it is possible to efficiently reduce the N deviation, in a condition where a steering operation speed is high and a person in the vehicle does not easily feel the unusual feeling resulted by the reduction of N deviation, and at the same time, it is possible to reduce the unusual feeling felt by a person in a vehicle by making the reduction of N deviation slow, in a condition where a steering operation speed is low.

In the above structure, the rudder angle control device may be configured to reduce the amount of control to make the above described relationship revert to a standard relationship, when magnitude of a steering operation speed is small, compared to when magnitude of a steering operation speed is large.

According to the above structure, the amount of control to make the above described relationship revert to a standard relationship, namely, an amount of reduction of N deviation is reduced when magnitude of a steering operation speed is small, compared to when magnitude of a steering operation speed is large. Thus, it is possible to securely make the reduction of N deviation slow in a condition where a steering operation speed is low, to thereby securely reduce the unusual feeling felt by a person in a vehicle. In a condition where a steering operation speed is high, the reduction amount of N deviation is not small, and therefore, it is possible to effectively reduce the N deviation. In this connection, even if the reduction amount of N deviation is reduced on the basis of a steering operation speed, the N deviation amount is decreased by repeatedly performed N deviation reduction.

In the above structure, the rudder angle control device may be configured not to perform the control to make the above described relationship revert to a standard relationship, when magnitude of a steering operation speed is equal to or lower than a reference value for steering operation speed.

Generally, when a steering operation speed is very slow such as a time when steering is held, it is inevitable that a person in a vehicle feels the unusual feeling resulted by the reduction of N deviation, even if the reduction of N deviation is slowed. According to the above structure, when a steering operation speed is equal to or lower than a reference value for the steering operation speed, the control to make the above described relationship revert to a standard relationship is not performed, and accordingly, it is possible to securely prevent a person in a vehicle from feeling the unusual feeling.

In the above structure, the rudder angle control device may be configured not to lower the speed of making the above described relationship revert to a standard relationship, irrespective of magnitude of steering operation speed, when magnitude of a curvature of a travelling lane in front of a vehicle is equal to or smaller than a reference value for the curvature.

Generally, the unusual feeling felt by a person in a vehicle resulted by a reduction of N deviation becomes more insignificant the more mild a change of traveling direction is. According to the above structure, when magnitude of a curvature of a travelling lane in front of a vehicle is equal to or smaller than a reference value for the curvature, it is possible to reduce the N deviation substantially without making a person in a vehicle feel the unusual feeling. In that case, since the above described relationship is made revert to a standard relationship without lowering the speed, it is possible to efficiently reduce the N deviation.

In the above structure, the rudder angle control device may be configured to lower the speed of making the above described relationship revert to a standard relationship when vehicle speed is high, compared to when vehicle speed is low.

According to the above structure, the speed of reducing the N deviation can be lowered when vehicle speed is high compared to when vehicle speed is low. Accordingly, when vehicle speed low, it is possible to efficiently reduce the N deviation without lowering the speed of reduction of N deviation, and when vehicle speed is high, it is possible to effectively reduce the unusual feeling felt by a person in a vehicle by lowering the speed of reduction of N deviation.

In the above structure, the rudder angle control device may be configured to reduce the amount of control to make the above described relationship revert to a standard relationship when vehicle speed is high, compared to when vehicle speed is low.

According to the above structure, the amount of control to make the above described relationship revert to a standard relationship, namely, the amount of N deviation reduction is reduced when the vehicle speed is high, compared to when the vehicle speed is low. Thus, it is possible to securely make the reduction of N deviation slow in a condition where the vehicle speed is high, to thereby securely reduce the unusual feeling felt by a person in a vehicle. On the other hand, in a condition where vehicle speed is low, since the reduction amount of N deviation is not small, it is possible to effectively reduce the N deviation. In this connection, even if the reduction amount of N deviation is reduced on the basis of a vehicle speed, the N deviation amount is decreased by repeatedly performed N deviation reduction.

In the above structure, the rudder angle control device may be configured to make the reference value for steering operation speed large when the vehicle speed is high, compared to when vehicle speed is low.

According to the above structure, the reference value for steering operation speed becomes large when vehicle speed is high, compared to a case when vehicle speed is low. Thus, in a condition where vehicle speed is high and a person in the vehicle easily feels the unusual feeling, it is possible to make the reference value for steering operation speed large to make the N deviation reduction control hard to be performed, to thereby effectively prevent the person in the vehicle from feeling the unusual feeling. On the other hand, when vehicle speed is low and a person in the vehicle does not easily feel the unusual feeling, it is possible to make the reference value for steering operation speed small to make the N deviation reduction control easy to be performed, to thereby efficiently reduce the N deviation.

In the above structure, the rudder angle control device may be configured to make the reference value for the curvature small when vehicle speed is high, compared to when vehicle speed is low.

According to the above structure, the reference value for the curvature becomes small when vehicle speed is high, compared to when vehicle speed is low. Thus, in a condition where vehicle speed is high and a person in the vehicle easily feels the unusual feeling, it is possible to make the reference value for the curvature small to make the N deviation reduction speed easy to be lowered, to thereby effectively prevent the person in the vehicle from feeling the unusual feeling. On the other hand, when vehicle speed is low and a person in the vehicle does not easily feel the unusual feeling, it is possible to make the reference value for the curvature large to make the N deviation reduction speed hard to be lowered, to thereby efficiently reduce the N deviation.

Moreover, in the above structure, the rudder angle control device may be configured to make the above described relationship revert to a standard relationship, even if the steering operation speed is equal to or less than a reference value for steering operation speed, if the control to make the above described relationship revert to a standard relationship is a control to move the steering input device to the position for straight forward movement of the vehicle.

In the above structure, the automatic steering control may be a control to automatically steer the steerable wheels so that a vehicle travels along a travelling lane.

In the above structure, the rudder angle varying device may be configured to drivingly turn the steerable wheels relatively to the steering input device as necessary.

Furthermore, in the above structure, the rudder angle varying device may be a by-wire type rudder angle varying device comprising a steerable wheel driving device which is not mechanically coupled to the steering input device, in which the steerable wheels are turned/driven by the steerable wheel driving device.

DETAILED DESCRIPTION

Hereinafter, a preferred embodiment of the present invention will be explained in detail with reference to the accompanying drawings.

Figure 1:
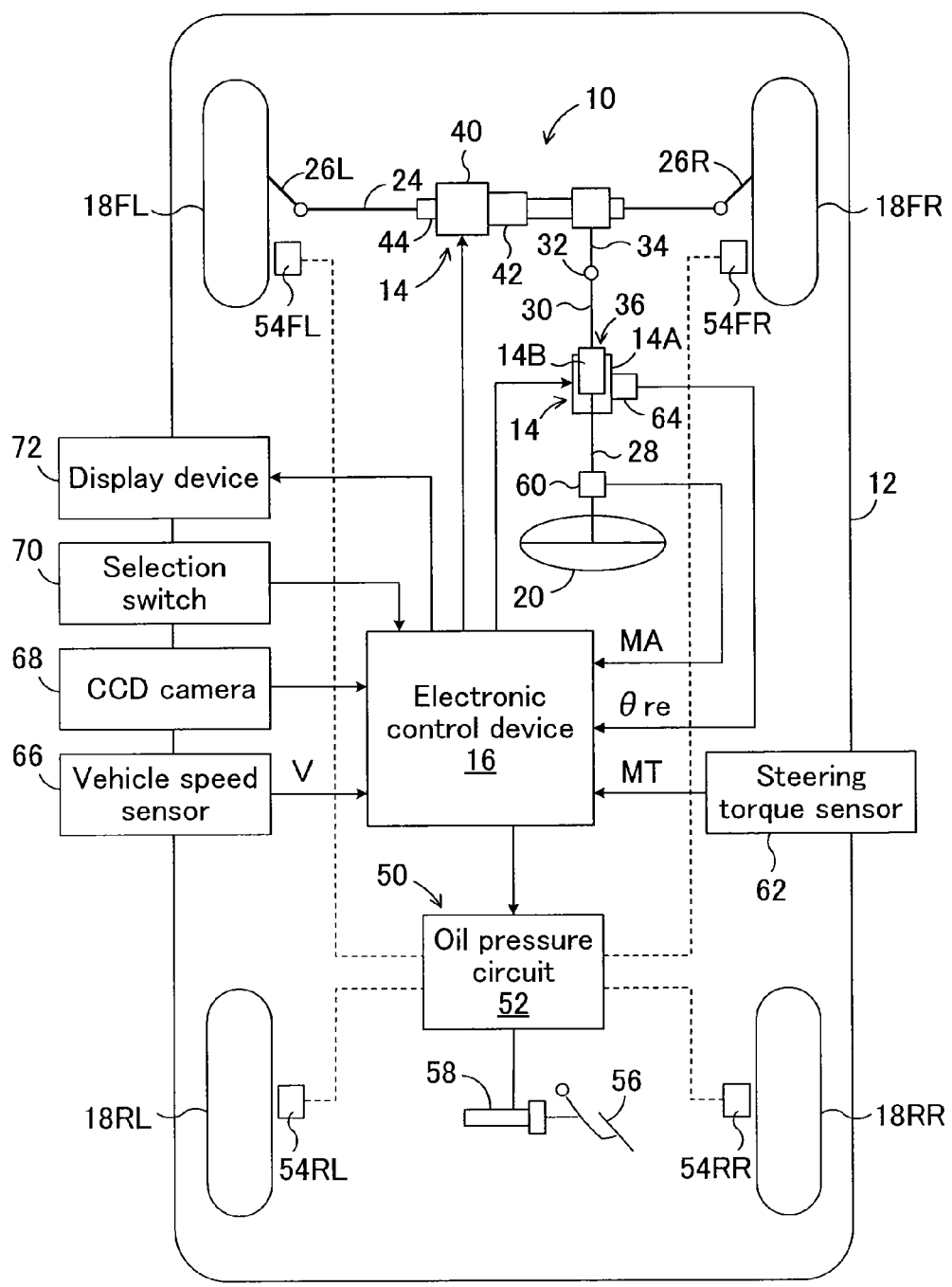
FIG. 1 is a schematic block diagram representing an embodiment of a vehicular travel control device according to the present invention applied in a vehicle in which an electric power steering device is installed.

FIG. 1 is a schematic block diagram representing an embodiment of a vehicular travel control device according to the present invention applied in a vehicle in which an electric power steering device is installed.

In FIG. 1, the travel control device 10 according to the present invention is installed in a vehicle 12 and comprises a rudder angle varying device 14 and an electronic control device 16 which controls the rudder angle varying device 14. In FIG. 1, 18FL and 18FR represent left and right front wheels of the vehicle 12 respectively, and 18RL and 18RR represent left and right rear wheels respectively. The left and right front wheels 18FL and 18FR which are steerable wheels are turned/driven through rack bars 24 and tie rods 26L and 26R, by a rack and pinion type electric power steering device 22 which is driven in response to an operation of a steering wheel 20 by a driver.

The steering wheel 20 which is a steering input device is drivingly connected with a pinion shaft 34 of the power steering device 22 through an upper steering shaft 28, the rudder angle varying device 14, a lower steering shaft 30, and a universal joint 32. The rudder angle varying device 14 comprises an electric motor 36 for auxiliary turning which is linked to the lower end of the upper steering shaft 28 at the side of a housing 14A, and linked to the upper end of the lower steering shaft 30 at the side of a rotor 14B through a speed reducer not shown in the figure.

Accordingly, the rudder angle varying device 14 subsidiarily drivingly turns the left and right front wheels 18FL and 18FR relatively to the steering wheel 20, by rotating/driving the lower steering shaft 30 relatively to the upper steering shaft 28. Thus, the rudder angle varying device 14 functions as a variable gear ratio steering device (VGRS) which increase or decrease the steering gear ratio (invers of steering transfer ratio). The rudder angle varying device 14 also functions as a rudder angle varying device for front wheels which changes the relationship between a rotational position of the steering wheel 20 and a rudder angle of the front wheels, by varying a rudder angle of the left and right front wheels irrespective of whether not the steering operation is being performed by a driver. As will be explained later in detail, the rudder angle varying device 14 is controlled by a rudder angle control device of the electronic control device 16.

In the illustrated embodiment, the left and right rear wheels 18RL and 18RR are non-steerable wheels. However, the travel control device of the present invention may be applied to a vehicle which is provided with a rudder angle varying device for rear wheels which varies the rudder angle of the left and right rear wheels independently from steering of the left and right front wheels 18FL and 18FR by a rear wheel-steering device not illustrated in the figures, irrespective of whether or not the steering operation is performed by a driver. In that case, the target rudder angle for making the vehicle travel along a travelling lane is calculated also for the rear wheels, and the rudder angle of the rear wheels are controlled to become a target rudder angle for rear wheels.

In the illustrated embodiment, the electric power steering device 22 is a rack-coaxial-type electric power steering device, and includes electric motor 40 and converting mechanism 42, for example, of a ball-screw type, that converts a rotational torque of the electric motor 40 into a force in a reciprocating direction of rack bar 24. The electric power steering device 22 is controlled by an electric power steering device (EPS) control unit of the electronic control device 16. The electric power steering device 22 generates an auxiliary steering force which drives the rack bars 24 relatively to a housing 44 to thereby alleviate steering load of a driver, and function as a steering assist force generating device which assists the rudder angle varying device 14 with its operation.

In this connection, the rudder angle varying device 14 may have any structure as long as it is capable of varying the rudder angle of the left and right front wheels without steering operation by a driver, or varying the rotational angle of the steering wheel 20. The steering assist force generating device may also have any structure as long as it is capable of generating the auxiliary steering force. The steering input device is the steering wheel 20, and its operational position is its rotational angle. However, the steering input device may also be a joystick type steering lever, and the operational position in that case may be its reciprocating operational position.

Braking force for each wheel is controlled in such a manner that pressure within wheel cylinders 54FL, 54FR, 54RL, and 54RR, namely, braking pressure, is controlled by oil pressure circuit 52 of braking device 50. Although not shown in FIG. 1, the oil pressure circuit 52 comprises an oil reservoir, an oil pump, and various valve devices. The braking pressure for each wheel cylinder is controlled by master cylinder 58 which is driven in response to a pedaling operation to brake pedal 56 by a driver. The braking pressure for each wheel cylinder is also individually controlled as needed, in such a manner that the oil pressure circuit 52 is controlled by a braking force control unit of the electronic control device 16. Thus, the braking device 50 is capable of individually controlling the braking force of each wheel, irrespective of braking operation by a driver.

In the illustrated embodiment, the upper steering shaft 28 is provided with a steering angle sensor 60 which detects rotational angle of the upper steering shaft as a steering angle MA. The pinion shaft 34 is provided with steering torque sensor 62 which detects steering torque MT. The rudder angle varying device 14 is provided with a rotational angle sensor 64 which detects relative rotational angle θre, namely, a relative rotational angle of the lower steering shaft 30 to the upper steering shaft 28.

A signal indicative of the steering angle MA, a signal indicative of the steering torque MT, and a signal indicative of the relative rotational angle θre, together with a signal indicative of a vehicle speed V detected by vehicle speed sensor 66, are input to the rudder angle control unit and the EPS controlling unit of the electronic control device 16. In this connection, it is also possible that a rotational angle of the lower steering shaft 30 is detected, and then, the relative rotational angle θre is obtained as a difference between a steering angle θ and the rotational angle of the lower steering shaft 30.

The vehicle 12 is also provided with a CCD camera 68 which photographs a forward view of the vehicle, and a selection switch 70 for selecting whether or not to perform a trajectory control (also called as "LKA (Lane Keep Assist) control") which makes a vehicle travel along a travelling lane which is operated by a person in the vehicle. A signal indicative of image information of a forward view of the vehicle photographed by the CCD camera 68, and a signal indicative of a position of the selection switch 70 are input to a travel control unit of the electronic control device 16. The image information of a forward view of a vehicle or information on a travelling lane may alternatively be obtained by means other than CCD camera.

Each control unit of the electronic control device 16 may comprises a microcomputer each comprising CPU, ROM, RAM, and input/output port device which are connected with one another via a bidirectional common bus. The steering angle sensor 60, the steering torque sensor 62, and the rotational angle sensor 64 detect the steering angle MA, the steering torque MT, and the relative rotational angle θre respectively, on the basis that a steering or a turning in the direction where a vehicle turns to the left should be detected as a positive value.

Figure 2:
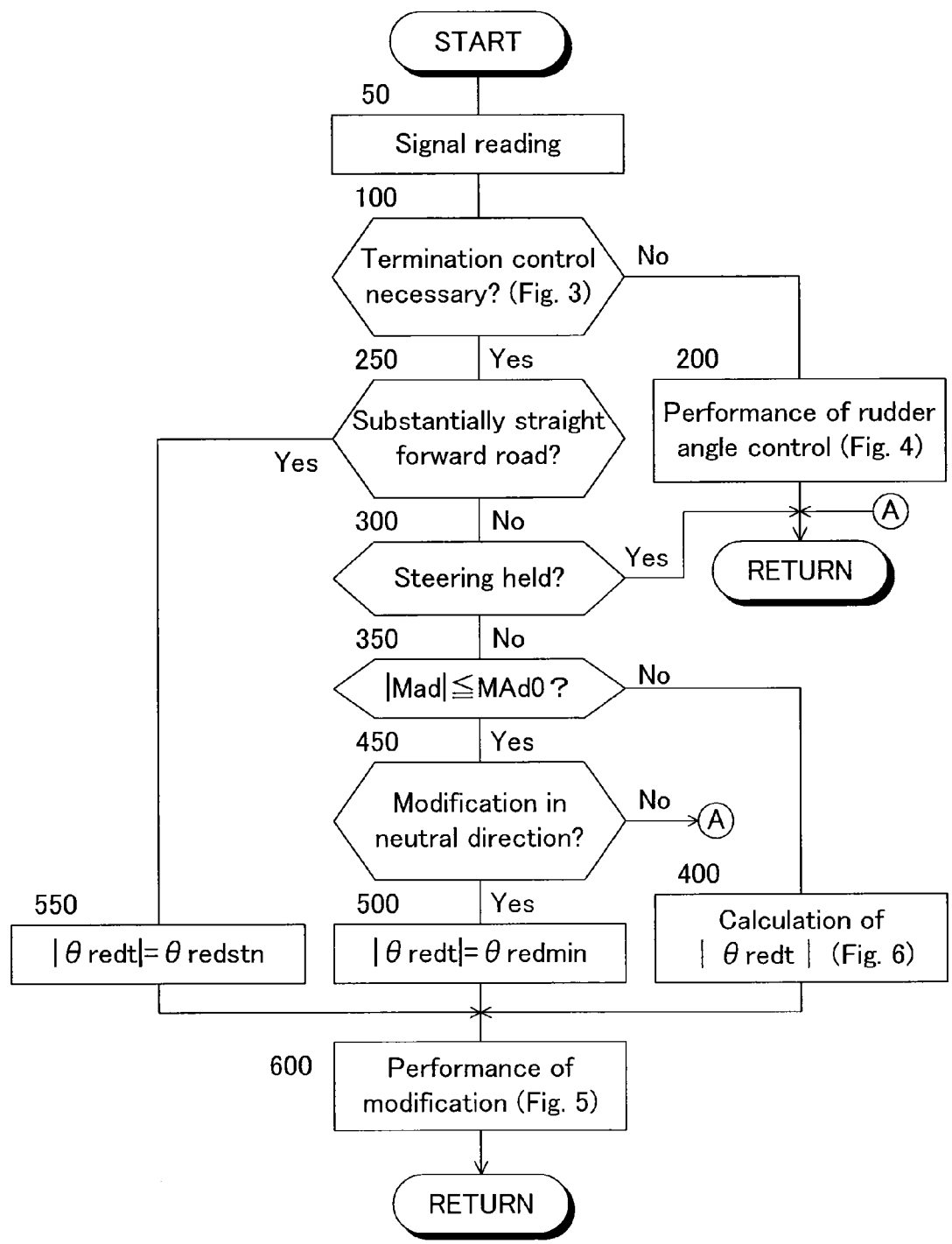
FIG. 2 is a flowchart representing a travel control routine of the embodiment.

As will be explained later in detail, when the selection switch 70 is on, the electronic control device 16 controls the rudder angle varying device 14 according to the flowchart shown in FIG. 2 etc., to thereby perform the trajectory control as a travel control which makes a vehicle travel along a travelling lane. In the trajectory control, the left and right front wheels 18FL and 18FR are steered in the automatic steering mode by the rudder angle varying device 14, etc., independently from steering operation of a driver.

The electronic control device 16 alleviates steering load of a driver by controlling the electric power steering device 22 on the basis of the steering torque MT, etc., and assists the rudder angle varying device 14 in controlling a rudder angle of the left and right front wheels to become a necessary rudder angle.

When the selection switch 70 is switched from ON to OFF, the electronic control device 16 terminates the trajectory control and performs a termination control. In other words, if a relationship between the steering angle MA and a steering angle MAs which corresponds to a rudder angle δf of the left and right front wheels is not in a standard relationship (if there is an N deviation) at the time of terminating the trajectory control, the electronic control device 16 performs the termination control for making the relationship become a standard relationship (reducing and removing the N deviation).

In particular, the electronic control device 16 calculates a time differential value MAd of the steering angle MA, as a steering angle speed. Besides, in the electronic control device 16, a target modification angle speed θredt for reducing the N deviation, namely, a target change rate for the relative rotational angle θre of the rudder angle varying device 14 is set variably on the basis of an absolute value of a steering operation speed MAd. In that case, the target modification angle speed θredt is variably set so as to be lower the smaller the absolute value of the steering operation speed MAd is. Then, the electronic control device 16 controls the rudder angle varying device 14 so that a modification angle speed θred for reducing the N deviation becomes the target modification angle speed θredt.

<Driving Control Routine>

In the next place, the travel control routine in the embodiment will be explained with reference to the flowchart shown in FIG. 2. The control according to the flowchart shown in FIG. 2 is initiated when the selection switch 70 is switched from ON to OFF, and repeatedly performed every predetermined time.

First, Step 50 performs reading of signal and the like which is indicative of the steering angle MA detected by the steering angle sensor 60.

Step 100 makes a decision of whether or not the termination control is necessary to be performed according to the flowchart shown in FIG. 3 as will be explained later. Then, when a positive decision is made, the control goes forward to Step 250, and when a negative decision is made, the control goes forward to Step 200.

Step 200 performs the rudder angle control in the automatic steering mode for the trajectory control as will be explained later, according to the flowchart shown in FIG. 4, to thereby control the rudder angle of the front wheels so as to make a vehicle travel along a travelling lane.

In Step 250, a target trajectory of the vehicle along a travelling lane is determined on the basis such as an analysis of image information of a forward view of the vehicle which is photographed by the CCD camera 68. Subsequently, curvature R (an inverse of a radius) of the target trajectory is estimated. Then, a decision is made on whether or not the travelling lane ahead of the vehicle is substantially a straight road, on the basis of a decision of whether or not an absolute value of a curvature R is equal to or less than a reference value R0 (positive fixed number). Then, when a positive decision is made, the control goes forward to Step 550, and when a negative decision is made, the control goes forward to Step 300.

In Step 300, the time differential value MAd of the steering angle MA is calculated as the steering angle speed, and makes a decision of whether or not the steering is being held, for example, on the basis of a decision of whether or not an absolute value of the steering angle speed MAd is equal to or less than a reference for a steering-holding decision value MAdc (a positive fixed number). Then, when a positive decision is made, the control goes forward to Step 50, and when a negative decision is made, the control goes forward to Step 350.

Step 350 makes a decision of whether or not the absolute value of the steering angle speed MAd is equal to or less than a reference value MAd0 for a modification inhibitory decision (positive fixed number larger than MAdc), in other words, makes a decision of whether or not the N deviation modification should be inhibited. Then, when a positive decision is made, the control goes forward to Step 450, and when a negative decision is made, the control goes forward to Step 400.

Figure 6:
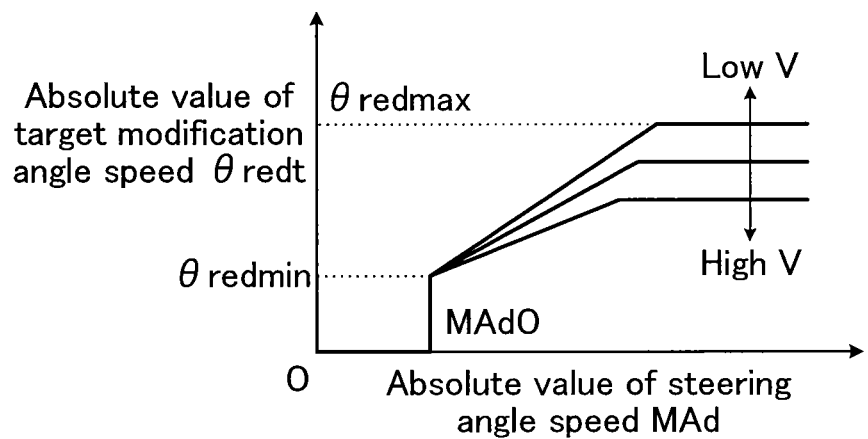
FIG. 6 is a map to calculate a target modification angle speed θredt for the N deviation reduction on the basis of an absolute value of a steering angle speed MAd and a vehicle speed V.

Step 400 calculates an absolute value of the target modification angle speed θredt for reducing the N deviation according to the map shown in FIG. 6, on the basis of the absolute value of the steering angle speed MAd and the vehicle speed V, and after that, the control goes forward to Step 600. Incidentally, the absolute value of the target modification angle speed θredt is calculated to become lower the smaller the absolute value of the steering angle speed MAd is, and to become lower the higher the vehicle speed V is.

Step 450 makes a decision of whether or not the N deviation modification is a modification which rotates the steering wheel 20 in the neutral direction, in other words, a decision of whether or not the N deviation modification is a modification in a direction in which an absolute value of the steering angle MA is decreased. Then, when a negative decision is made, the control goes back to Step 50, and when a positive decision is made, the control goes forward to Step 500.

In Step 500, the absolute value of the target modification angle speed θredt is set to be the minimum value θredmin (positive fixed number) thereof, and in Step 550, the absolute value of the target modification angle speed θredt is set to be a standard value θredstn thereof. After Step 500 or Step 550 is completed, the control goes forward to Step 600. Incidentally, the standard value θredstn may be a value which is larger than the minimum value θredmin and smaller than the maximum value θredmax (see FIG. 6) or equal to the maximum value θredmax.

In Step 600, the modification of N deviation is performed as described later according to the flowchart shown in FIG. 5, to thereby reduce the size of the N deviation.

<Routine for Deciding Necessity of Termination Control>

Figure 3:
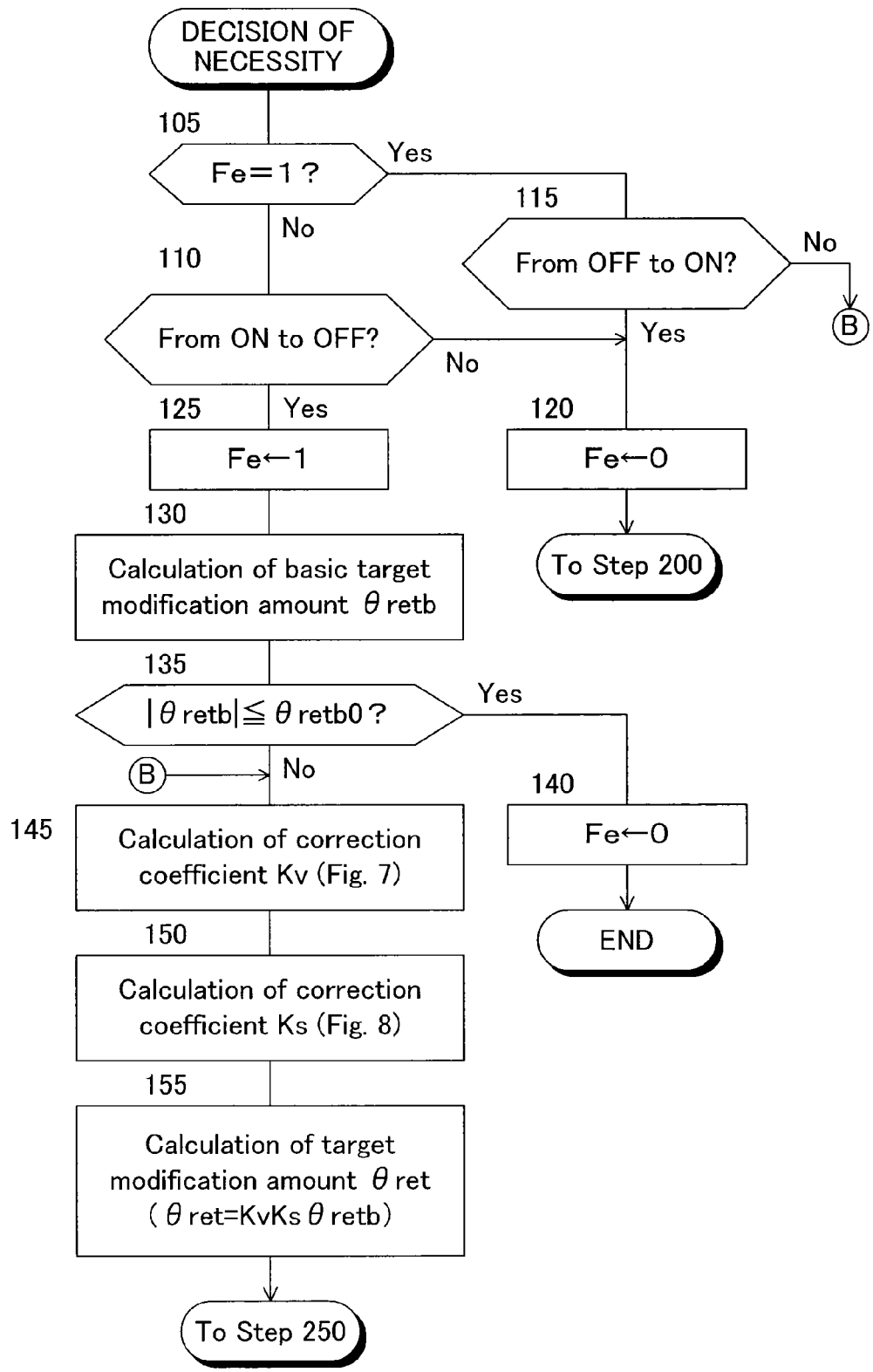
FIG. 3 is a flowchart representing a routine for deciding necessity of a termination control which is performed in Step 100 of FIG. 2.

In Step 105 of the routine for deciding necessity of termination control shown in FIG. 3, a decision of whether or not a flag Fe is 1, in other words, a decision of whether or not the termination control is being performed is made. Then, when a positive decision is made, the control goes forward to Step 115, and when a negative decision is made, the control goes forward to Step 110.

Step 110 makes a decision of whether or not the selection switch 70 has been switched from ON to OFF. Then when a negative decision is made, the flag Fe is resets to be 0 in Step 120, and then, the control goes forward to Step 200. By contrast, when a positive decision is made, the flag Fe is set to be 1 in Step 125, and then, the control goes forward to Step 130.

Step 115 makes a decision of whether or not the selection switch 70 has been switched from OFF to ON. Then, when a negative decision is made, the control goes forward to Step 145, and when a positive decision is made, the control goes forward to Step 120.

As an N deviation amount at the time of initiating the termination control, Step 130 sets the relative rotational angle θre of the rudder angle varying device 14 at that point of time to be a basic target modification amount θretb. This basic target modification amount θretb is equal to a deviation between the steering angle MAs which corresponds to the rudder angle δf of the left and right front wheels 18FL and 18FR and the steering angle MA detected by the steering angle sensor 60.

Step 135 makes a decision of whether or not an absolute value of a basic target modification amount θretb is equal to or less than a reference value θretb0 (positive fixed number), namely, a decision of whether or not the modification of N deviation can be omitted. When a negative decision is made, the control goes forward to Step 145, and when a positive decision is made, the flag Fe is reset to be 0 in Step 140, and then, the travel control performed according to the flowchart shown in FIG. 2 is terminated. In other words, the rudder angle varying device 14 does not operate, a manual steering mode is initiated, and the upper steering shaft 28 and the lower steering shaft 30 start rotating in an integrated manner.

Figure 7:
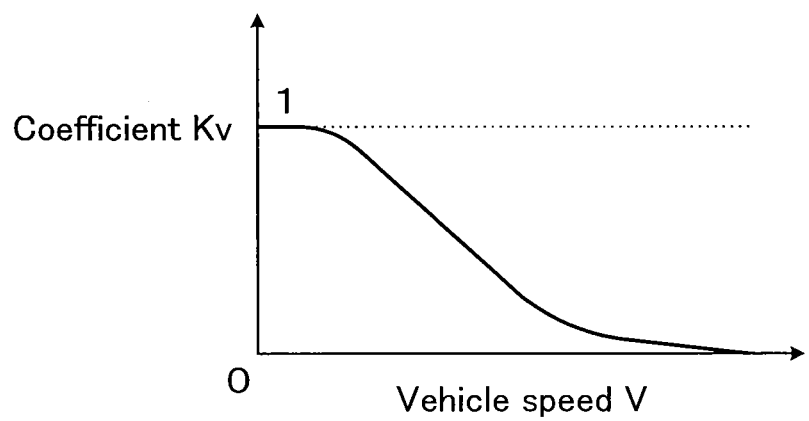
FIG. 7 is a map to calculate a correction coefficient Kv on the basis of the vehicle speed V.

In Step 145, a correction coefficient Kv to the basic target modification amount θretb is calculated from the map shown in FIG. 7 on the basis of the vehicle speed V. The correction coefficient Kv is calculated to be 1 in the extremely low speed range, and to be smaller the higher the vehicle speed V is, as shown in FIG. 7.

Figure 8:
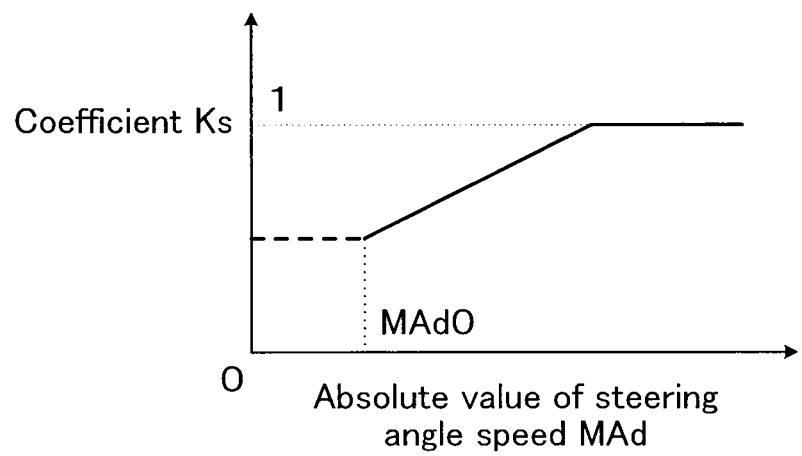
FIG. 8 is a map to calculate a correction coefficient Ks on the basis of the absolute value of the steering angle speed MAd.

In Step 150, a correction coefficient Ks to the basic target modification amount θretb is calculated from the map shown in FIG. 8 on the basis of the absolute value of the steering angle speed MAd. The correction coefficient Ks is calculated to be 1 in the range in which the absolute value of the steering angle speed MAd is large, and to be smaller the smaller the absolute value of the steering angle speed MAd is, as shown in FIG. 8.

In Step 155, a target modification amount θret corrected by the correction coefficients Kv and Ks is calculated according to the following formula (1), and after that, the control goes forward to Step 250.

$$\theta ret = Kv Ks \theta retb \quad (1)$$

In this connection, although not shown in the flowcharts of FIGS. 2 to 5, when the control is switched, for example, such as in a case in which a positive decision is made in Step 100 and the termination control is initiated, a visual and/or an audio notice information is given to a person in a vehicle by display device 72.

<Routine of Rudder Angle Control>

Figure 4:
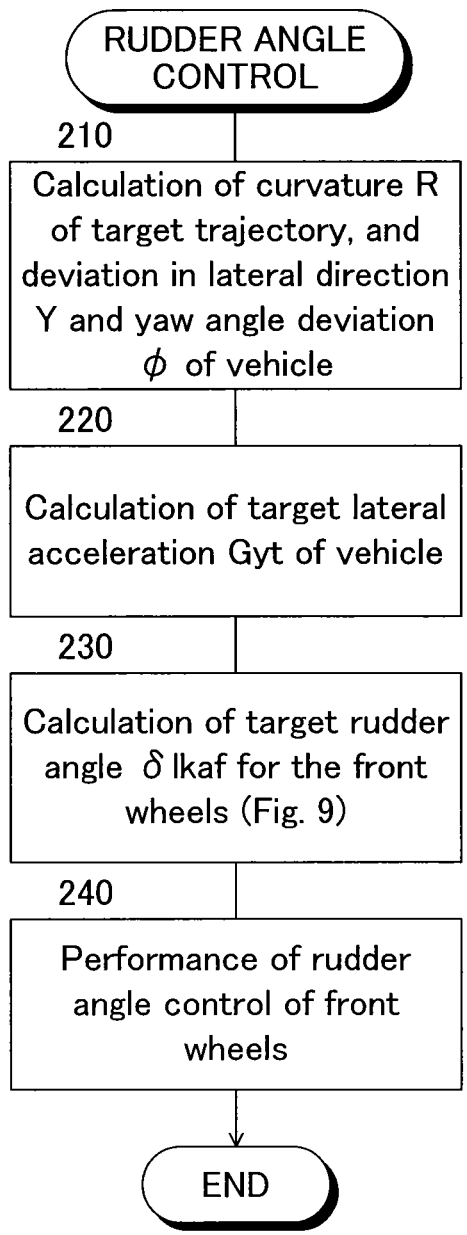
FIG. 4 is a flowchart representing a routine for rudder angle control which is performed in Step 200 of FIG. 2.

In Step 210 of a routine of rudder angle control shown in FIG. 4, a target trajectory of a vehicle along a travelling lane is determined on the basis such as an analysis of image information of a forward view of a vehicle which is photographed by the CCD camera 68. In addition, a curvature R of the target trajectory (an inverse of a radius), and a deviation in lateral direction Y and a deviation of yaw angle φ of the vehicle from the target trajectory are calculated.

Incidentally, the determination of the target trajectory of a vehicle may be made also on the basis of information from a navigation device which is not shown in the figures, or may be made also on the basis of a combination of the analysis of the image information and the information from the navigation device. The curvature R, etc. of the target trajectory are parameters which are necessary in performing the trajectory control for making a vehicle travel along the target trajectory. However, since the calculation manner therefor does not constitute the gist of the present invention, these parameters may be calculated in any manner.

In Step 220, a target lateral acceleration Gyt is calculated as a target state amount of a vehicle which is necessary in making the vehicle travel along the target trajectory on the basis of the parameters for the trajectory control described above. The target lateral acceleration Gyt may be calculated by a function of the above parameters for the trajectory control described above. It is also possible to provide a map which shows a relationship between the parameters for the trajectory control described above and the target lateral acceleration Gyt, and to calculate the target lateral acceleration Gyt from the map, on the basis of the parameters for the trajectory control described above.

Figure 9:
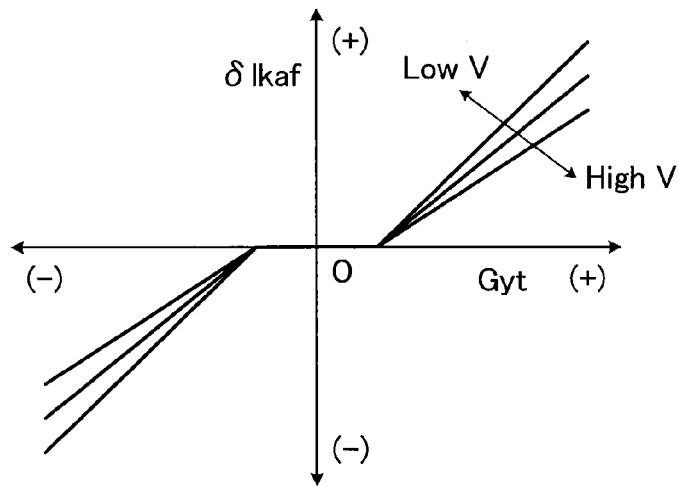
FIG. 9 is a map to calculate target rudder angle δlkaf of front wheels on the basis of a target lateral acceleration Gyt and the vehicle speed V.

In Step 230, a target rudder angle δlkaf of the front wheels for the trajectory control is calculated from the map shown in FIG. 9, on the basis of the target lateral acceleration Gyt of the vehicle.

In Step 240, the rudder angle varying device 14 is controlled so that a rudder angle δf of the left and right front wheels 18FL and 18FR becomes the target rudder angle δlkaf.

<N Deviation Modification Routine>

Figure 5:
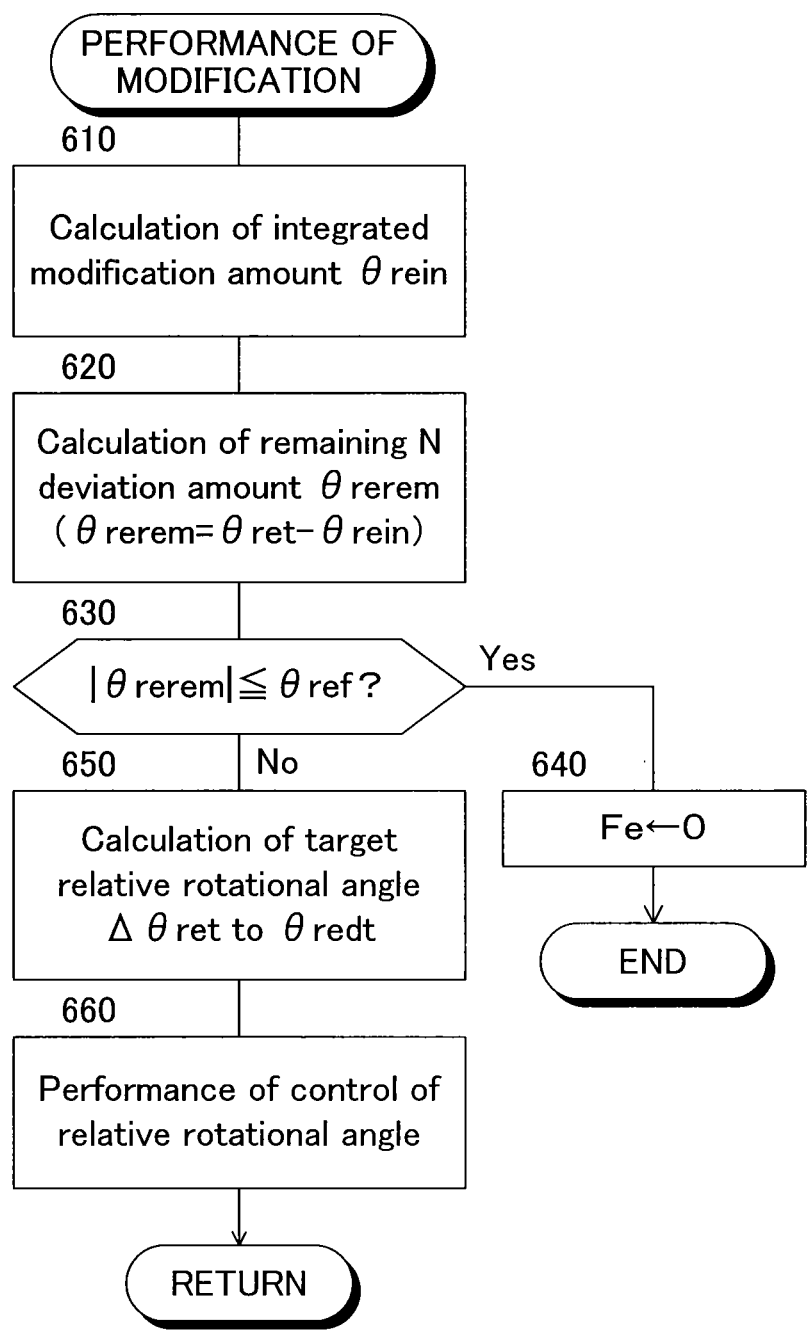
FIG. 5 is a flowchart representing a routine for N deviation modification which is performed in Step 600 of FIG. 2.

Step 610 in the N deviation modification routine shown in FIG. 5 calculates an integrated modification amount θrein of an N deviation, that is, a total sum of modification amount of N deviation modification which has been performed in Step 600 of each cycle after the termination control was initiated.

In Step 620, a remaining N deviation amount θrerem, that is, an N deviation amount which has not been modified is calculated according to the formula (2) below.

$$\Theta rerem = \Theta ret - \Theta rein \quad (2)$$

Step 630 makes a decision of whether or not the absolute value of the remaining N deviation amount θrerem is equal to or less than a reference value θref (positive fixed number) for modification termination, in other words, a decision of whether or not the modification of the N deviation may be terminated. Then, when a negative decision is made, the control goes forward to Step 650, and when a positive decision is made, the flag Fe is reset to be 0 in Step 640, and then, the control performed according to the flowchart shown in FIG. 2 is terminated, and the manual steering mode is initiated.

Step 650 calculates a target relative rotational angle Δθret for making a modification speed of the N deviation become the target modification angle speed θredt. In this connection, the target relative rotational angle Δθret may be calculated as a product of the target modification angle speed θredt and a cycle time Δt of the flowchart shown in FIG. 2.

In Step 660, the rudder angle varying device 14 is controlled so that the relative rotational angle Δθre of the rudder angle varying device 14 becomes the target relative rotational angle Δθret, to thereby modify the N deviation at a modification angle speed of the target modification angle speed θredt.

<Trajectory Control>

In the embodiment configured as described above, when the selection switch 70 is on, a negative decision is made in Step 100. Specifically, a negative decision is made each in Steps 105 and 110 of the flowchart shown in FIG. 3. Accordingly, the rudder angle varying device 14 is controlled in Step 200 to thereby perform the trajectory control which makes a vehicle travel along the target trajectory.

<Termination Control>

When the selection switch 70 is switched from ON to OFF, a positive decision is made in Step 100. Specifically, a negative decision is made in Step 105, and a positive decision is made in Step 110 in the flowchart shown in FIG. 3. Then, Step 125 and subsequent Steps are performed to initiate the termination control.

Once the termination control is initiated, a positive decision is made in Step 105, and a negative decision is made in Step 115. Accordingly, Step 145 and the subsequent Steps are repeatedly performed to gradually reduce the N deviation.

In the next place, the termination control in the above described embodiment will be explained in detail concerning various traveling situations of a vehicle.

A. A case in which a steering operation was performed

A1. a case in which speed of the steering operation is high

In a case in which a steering operation is performed during the termination control, and speed of the steering operation is high, a negative decision is made in each of Steps 250, 300 and 350, irrespective of the direction of the steering operation. Then, in Step 400, the absolute value of the target modification angle speed θredt for reducing the N deviation is calculated from the map shown in FIG. 6, on the basis of the absolute value of the steering angle speed MAd and the vehicle speed V. Then, in Step 600, a modification of the N deviation is performed to thereby reduce the size of the N deviation.

Here, these Steps are repeatedly performed as long as negative decision is made in Step 630 in the rudder angle control routine of Step 600. In other words, the modification of N deviation is completed when the absolute value of the remaining modification amount of N deviation θrerem becomes equal to or less than the reference value θref for the modification termination and a positive decision is made in Step 630.

Figure 10:
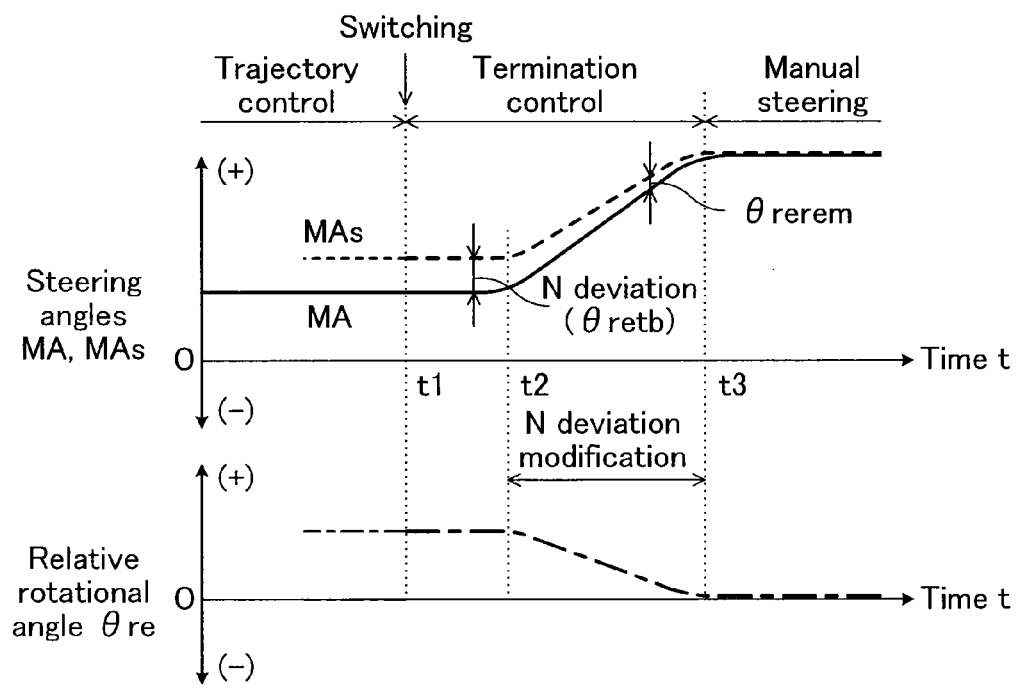
FIG. 10 represents an example of changes of steering angles MA and MAs and a relative rotational angle θre in a case in which a steering operation is initiated during the termination control and speed of steering operation is high.

For example, FIG. 10 represents an example of changes of the steering angles MA and MAs and the relative rotational angle θre in a case in which a steering operation is initiated during the termination control and the speed of the steering operation is high. As shown in FIG. 10, it is provided that the selection switch 70 is switched from ON to OFF at the time point t1, and a steering operation by a driver is initiated between the time point t1 and the time point t2. At the time point t1, the trajectory control is terminated and the termination control is initiated.

If the absolute value of the steering angle speed MAd exceeded the reference value MAd0 at the time point t2, the reduction of N deviation is initiated at the time point t2, and accordingly, the remaining N deviation amount θrerem is gradually decreased. If an absolute value of the remaining N deviation amount θrerem becomes equal to or less than the reference value θref at the time point t3, the reduction of N deviation is terminated and a manual steering mode is initiated at the time point t3.

In this connection, although not shown in FIG. 10, when a steering operation is performed from a steering-held state, the steering operation speed is increased from 0, and therefore exactly, an operation of "A2. A case in which the steering operation speed is low" which will be described later is included herein.

As understood from the above explanation, when a steering operation is performed at a high steering operation speed during the termination control in a situation in which the travelling lane is not substantially a straight forward road, the absolute value of the target modification angle speed θredt is calculated to be a larger value. Thus, the N deviation can efficiently be reduced in a situation in which there is low concern that a person in the vehicle feels the unusual feeling resulted by the reduction of N deviation.

In addition, the absolute value of the target modification angle speed θredt is calculated to be a smaller value the lower the steering operation speed is. Thus, it is possible to lower the reduction speed of the N deviation, when the steering operation speed is low, and there is a higher concern that a person in the vehicle feel the unusual feeling resulted by the reduction of N deviation, to thereby effectively reduce the unusual feeling felt by the person in the vehicle.

In addition, the absolute value of the target modification angle speed θredt is calculated to be a larger value the lower the vehicle speed is. Accordingly, when the vehicle speed is low, it is possible to efficiently reduce the N deviation without lowering the N deviation reduction speed, and when the vehicle speed is high, it is possible to effectively reduce the unusual feeling felt by a person in a vehicle by reducing the N deviation reduction speed.

A2. A case in which the steering operation speed is low

Even when a steering operation is performed during the termination control, if a speed the steering operation is low, a positive decision is made in Step 350, while a negative decision is made in each of Steps 250 and 300. The N deviation modification when the steering operation speed is low varies depending on whether or not the N deviation modification is a modification to rotate the steering wheel 20 in the neutral direction.

A2-1. A case in which N deviation modification is in neutral direction

A positive decision is made in Step 450. Accordingly, in Steps 500 and 600, the N deviation modification is performed so that the absolute value of the modification angle speed for reducing the N deviation becomes the minimum value θretmin. Incidentally, these Steps are also repeatedly performed as long as the negative decision is made in Step 630 in the rudder angle control routine of Step 600.

Figure 11:
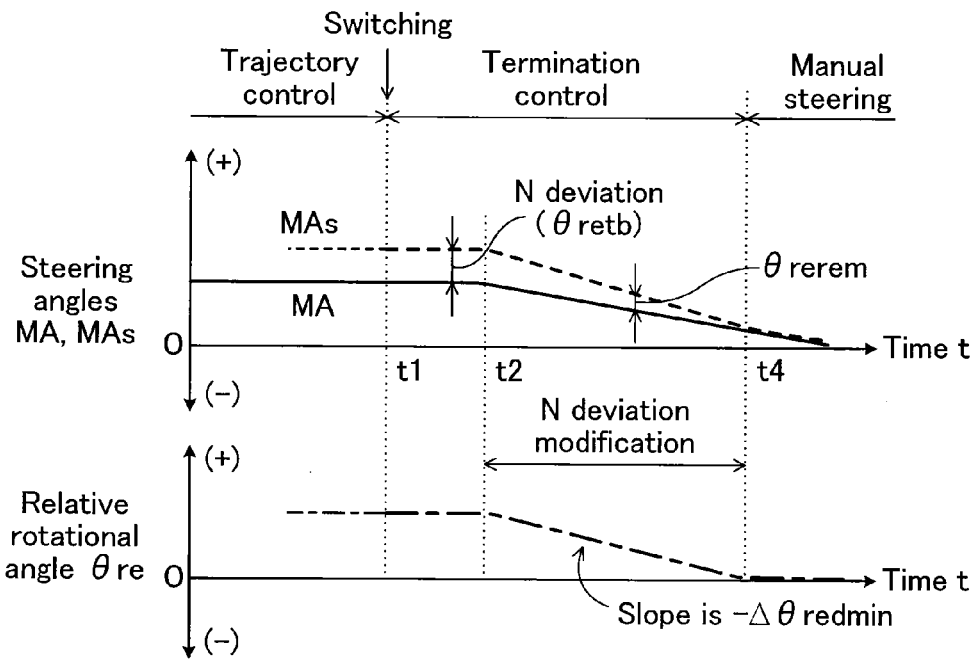
FIG. 11 represents an example of the changes of the steering angles MA and MAs and the relative rotational angle θre in a case in which a steering operation toward a neutral direction is performed at a low speed during the termination control and an N deviation modification which rotates the steering wheel in the neutral direction is performed.

For example, FIG. 11 represents an example of changes of the steering angles MA and MAs and the relative rotational angle θre in a case in which a steering operation toward a neutral direction is performed at a low speed during the termination control, and the N deviation modification which rotates the steering wheel in the neutral direction is performed. As shown in FIG. 11, it is provided that the steering operation toward the neutral direction was initiated between the time point t1 and the time point t2 by a driver at a low speed.

If the absolute value of steering angle speed MAd exceeded the reference value MAd0 at the time point t2, the reduction of N deviation is initiated at the time point t2, and accordingly, the remaining N deviation amount θrerem is gradually decreased. If an absolute value of a remaining N deviation amount θrerem became equal to or less than the reference value θref at the time point t4, the reduction of N deviation is terminated and a manual steering mode is initiated at the time point t4.

Thus, it is possible to efficiently reduce the N deviation, compared to a case in which, even if a steering operation is performed during the termination control, the reduction of N deviation is inhibited irrespective of the direction of the steering operation when the steering operation speed is low. In this connection, in a case in which the N deviation modification is a modification to rotate the steering wheel in the neutral direction, the unusual feeling felt by a person in the vehicle is insignificant by far compared to a case in which the N deviation modification is in the opposite direction.

A2-2. A case in which modification of N deviation is toward a direction opposite to the neutral direction A negative decision is made in Step 450, and the control goes back to Step 50. Accordingly, no reduction of N deviation is performed.

Figure 12:
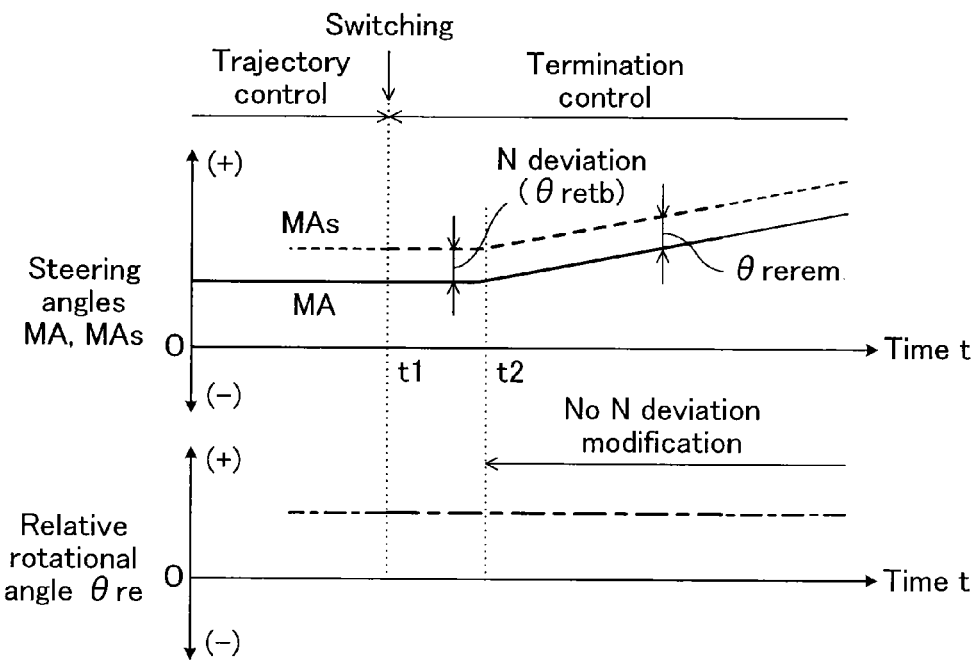
FIG. 12 represents an example of the changes of the steering angles MA and MAs and the relative rotational angle θre in a case in which a steering operation toward a direction opposite to the neutral direction is performed at a low speed during the termination control and N deviation modification which rotates the steering wheel in a direction opposite to the neutral direction is performed.

For example, FIG. 12 represents an example of changes of the steering angles MA and MAs and the relative rotational angle θre in a case in which a steering operation toward a direction opposite to the neutral direction is performed at a low speed, and the N deviation modification which rotates the steering wheel in a direction opposite do the neutral direction is performed during the termination control. As shown in FIG. 12, it is provided that the steering operation toward the opposite direction to the neutral direction was initiated at a low speed by a driver between the time point t1 and the time point t2, and the absolute value of the steering angle speed MAd exceeded the reference value MAd0 at the time point t2. Nevertheless, no reduction of N deviation is initiated at the time point t2. Therefore, the remaining N deviation amount θrerem is not decreased.

Accordingly, when the modification of N deviation is in an opposite direction to the neutral direction, no modification of N deviation is performed, and therefore, it is possible to securely prevent a person in a vehicle from feeling the unusual feeling resulted by the reduction of N deviation.

B. A case in which steering is being held

In a case in which no steering operation is performed during the terminal control, and the steering is being held, a positive decision is made in Step 100, a negative decision is made in Step 250, and a positive decision is made in Step 300. Therefore, even if there is an N deviation, Step 350 and subsequent Steps, namely, the modification of N deviation is not performed.

Accordingly, in a case in which the steering-held state is continued from the time of initiation of the termination control, the modification of N deviation is not initiated. In a case in which a steering-held state follows the steering operation of A1 or A2-1 described above which is performed after the point of time at which the termination control is initiated, although the modification of N deviation is initiated due to an initiation of the steering operation, the modification of N deviation is cancelled once the steering-held state follows, even if the N deviation is left.

Therefore, also in a case in which the steering is held, the modification of N deviation is not performed, and accordingly, it is possible to securely prevent a person in a vehicle from feeling the unusual feeling resulted by the reduction of N deviation.

C. A case in which travelling lane is substantially straight road

When a travelling lane is substantially a straight road, a positive decision is made in each of Steps 100 and 250, and in Step 550, the absolute value of the target modification angle speed θredt is set to be the standard value θredstn therefor. Then, in Step 600, the modification of N deviation is performed so that the modification angle speed to reduce the N deviation becomes the target modification angle speed θredt of the standard value θredstn. Incidentally, these Steps are also repeatedly performed as long as the negative decision is made in Step 630 of the rudder angle control routine of Step 600.

Thus, the modification of N deviation is performed at a uniform modification angle speed θredstn, irrespective of whether or not a steering operation is being performed, and irrespective of whether the steering operation speed is high or low. Accordingly, in a case in which a travelling lane is substantially a straight forward road, and there is low concern that a person in a vehicle feels the unusual feeling, it is possible to securely perform the modification of N deviation to thereby efficiently reduce the N deviation substantially without making a person in a vehicle feel the unusual feeling.

D. A case in which N deviation amount is small

When the N deviation amount at the time of initiation of the termination control is small (including a case in which the N deviation amount is 0), a positive decision is made in Step 135, and the flag Fe is reset to 0 in Step 140. Accordingly, the travel control which is performed according to the flowchart shown in FIG. 2 is terminated, substantially without the termination control performed, and the manual steering mode is initiated.

E. A case in which selection switch 70 is switched from OFF to ON

When the selection switch 70 is switched from OFF to ON during the termination control, a negative decision is made in Step 100. More specifically, a positive decision is made in each of Steps 105 and 115 in the flowchart shown in FIG. 3. Accordingly, Step 200 is performed so that the termination control is cancelled and the trajectory control is resumed. Accordingly, even during the termination control, a person in a vehicle can resume the trajectory control by cancelling the termination control by switching the selection switch 70 to on.

Hereinabove, the present invention has been explained in detail on the specific embodiment. However, the present invention is not limited to the embodiment described above, and it should be obvious for those skilled in the art that various other embodiments can be realized within the scope of the present invention.

For example, in the embodiment described above, although the reference value R0 for the decision in Step 250 is a positive fixed number, it may also be set variably according to the vehicle speed V so as to be smaller the higher the vehicle speed V is. Similarly, although the reference value MAd0 for the decision in Step 350 is a positive fixed number which is larger than MAdc, it may also be set variably according to the vehicle speed V so as to be larger the higher the vehicle speed V is.

In addition, in the above embodiment, when a positive decision is made in Step 350, Steps 450 and 600 are to be performed. However, a modification may be made such that when a positive decision is made in Step 350, the control goes back to Step 50 irrespective of the direction of N deviation modification.

Furthermore, in the above embodiment, the absolute value of the target modification angle speed θredt which is calculated in Step 400 is set variably according to the vehicle speed V so as to be smaller the higher the vehicle speed V is. However, a modification may be made such that the absolute value of the target modification angle speed θredt is based only on the absolute value of the steering angle speed MAd, irrespective of whether the vehicle speed V is high or low.

Furthermore, in the above embodiment, the absolute value of the target modification angle speed θredt is to be set to the minimum value θredmin thereof, in Step 500. However, the absolute value of the target modification angle speed θredt set in Step 500 may be a value different from the minimum value θredmin of the absolute value of the target modification angle speed θredt calculated in Step 400 when the absolute value of the steering angle speed MAd is MAd0.

Furthermore, in the above embodiment, the correction coefficient Kv based on the vehicle speed V is calculated in Step 145, and the correction coefficient Ks based on the absolute value of the steering angle speed Mad is calculated in Step 150. However, at least one of these correction coefficients may be omitted.

Furthermore, in the above embodiment, the left and right front wheels which are the steerable wheels are to be steered by the rudder angle varying device 14 which drivingly rotates the lower steering shaft 30 relatively to the upper steering shaft 28. However, the rudder angle varying device which steers the steerable wheels may be a by-wire type steering device.

Furthermore, in the above embodiment, the rudder angle control is to be performed in order to achieve the trajectory control which makes a vehicle travel along a target trajectory. However, the rudder angle control may be any rudder angle control, such as a lane deviation preventing control which controls a vehicle not to deviate from a lane, or a control which makes a vehicle travel after a preceding vehicle, as far as it steers the left and right front wheels in the automatic steering mode.

The invention claimed is:

1. A vehicular steering control device which comprises:
a rudder angle varying device which changes a relationship between an operational position of a steering input device operated for steering by a driver and a rudder angle of steering wheels; and a rudder angle control device which performs an automatic steering control which controls the rudder angle of said steering wheels by controlling said rudder angle varying device; and said rudder angle control device performs a termination control which makes said relationship revert to a standard relationship when said automatic steering control is terminated, wherein said rudder angle control device lowers a speed of making said relationship revert to said standard relationship by reducing a control amount for making said relationship revert to said standard relationship when a magnitude of a steering operation speed is small, compared to when a magnitude of a steering operation speed is large; and said rudder angle control device does not lower a speed of making said relationship revert to said standard relationship when a magnitude of a curvature of a driving lane in front of a vehicle is equal to or smaller than a reference value for a curvature.

2. The vehicular steering control device according to claim 1, wherein said rudder angle control device does not perform the control for making said relationship revert to said standard relationship by reducing a control amount for making said relationship revert to said standard relationship to 0 when a magnitude of a steering operation speed is equal to or less than a reference value of a steering operation speed.

3. The vehicular steering control device according to claim 2, wherein said rudder angle control device makes the reference value for said steering operation speed large when a vehicle speed is high, compared to when a vehicle speed is low.

4. The vehicular steering control device according to claim 1, wherein said rudder angle control device lowers a speed of making said relationship revert to said standard relationship when a vehicle speed is high, compared to when a vehicle speed is low.

5. The vehicular steering control device according to claim 1, wherein said rudder angle control device makes the control amount for making said relationship revert to said standard relationsip small when a vehicle speed is high, compared to when a vehicle speed is low.

6. The vehicular steering control device according to claim 1 wherein said rudder angle control device makes the reference value for a curvature small when a vehicle speed is high, compared to when a vehicle speed is low.

* * * * *